United States Patent
Nakagawa (10) Patent No.: US 12,495,781 B2
(45) Date of Patent: Dec. 16, 2025

(54) FISHING ROD REEL SEAT, FISHING ROD, AND NUT

(71) Applicant: GLOBERIDE, INC., Higashikurume (JP)

(72) Inventor: Shintaro Nakagawa, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 2 days.

(21) Appl. No.: 18/839,872

(22) PCT Filed: Jan. 13, 2023

(86) PCT No.: PCT/JP2023/000700
§ 371 (c)(1),
(2) Date: Aug. 20, 2024

(87) PCT Pub. No.: WO2023/248508
PCT Pub. Date: Dec. 28, 2023

(65) Prior Publication Data
US 2025/0176516 A1    Jun. 5, 2025

(30) Foreign Application Priority Data
Jun. 21, 2022  (JP) ................ 2022-099912

(51) Int. Cl.
*A01K 87/06*    (2006.01)
(52) U.S. Cl.
CPC .................... *A01K 87/06* (2013.01)
(58) Field of Classification Search
CPC ...... A01K 87/06; A01K 87/00; F16B 37/0885
See application file for complete search history.

(56) References Cited

U.S. PATENT DOCUMENTS

| | | | | |
|---|---|---|---|---|
| 3,701,550 A | * | 10/1972 | Jacobson | ............... F16L 15/08 411/389 |
| 2015/0040463 A1 | * | 2/2015 | Lin | .................. A01K 87/06 43/22 |

(Continued)

FOREIGN PATENT DOCUMENTS

| | | | |
|---|---|---|---|
| JP | 2000189010 A | * | 7/2000 |
| JP | 2005185214 A | * | 7/2005 |

(Continued)

OTHER PUBLICATIONS

Feb. 21, 2023 International Search Report issued in International Patent Application No. PCT/JP2023/000700.

*Primary Examiner* — Brady W Frazier
*Assistant Examiner* — Steven J Shur
(74) *Attorney, Agent, or Firm* — Oliff PLC (57) ABSTRACT

Provided is a nut capable of enabling smooth rotation while reliably fixing an outer tubular portion with an inner tubular portion as well as of improving decorativeness significantly, a fishing rod reel seat having the nut, and a fishing rod having the fishing rod reel seat. A nut according to an embodiment of the present invention is a nut for moving a movable hood, the nut being screwed with a male screw portion of a reel seat main body having a reel leg placing portion on which a reel leg is placed, the nut comprising: a nut base portion having a moving female screw portion on an inner peripheral surface and locked to the movable hood at an end, the female screw portion being screwed with the male screw portion of the reel seat main body; an inner tubular portion having a protruding portion or recessed portion, and fixed to an exterior of the nut base portion; and an outer tubular portion having a recessed portion or protruding portion engaged with the protruding portion or recessed portion, and fixed to an exterior of the inner tubular portion by the recessed portion or protruding portion, the (Continued)

outer tubular portion having an outer peripheral surface serving as at least a part of an outer peripheral surface of the nut, wherein the outer tubular portion has a through-hole penetrating in an inward and outward direction, and is provided at a position where at least a part of the through-hole and at least a part of the recessed portion or protruding portion overlap when viewed in an axial direction of the outer tubular portion.

13 Claims, 11 Drawing Sheets

(56) References Cited

U.S. PATENT DOCUMENTS

2021/0231162 A1* 7/2021 Tan ............... F16B 5/0208
2021/0364032 A1* 11/2021 Rice .............. F16B 31/02

FOREIGN PATENT DOCUMENTS

| JP | 2014-161234 A | | 9/2014 |
|---|---|---|---|
| JP | 2018068227 A | * | 5/2018 |
| JP | 2019110822 A | * | 7/2019 |
| JP | 2020-089310 A | | 6/2020 |
| JP | 2021141903 A | * | 9/2021 |

* cited by examiner

FISHING ROD REEL SEAT, FISHING ROD, AND NUT

TECHNICAL FIELD

Cross Reference

The present application claims priority based on Japanese Patent Application No. 2022-099912 (filed on Jun. 21, 2022), the contents of which are incorporated herein by reference in their entirety.

The present invention relates to a nut, a fishing rod reel seat comprising the nut, and a fishing rod comprising the fishing rod reel seat.

BACKGROUND ART

Conventionally, various devices for fixing a fishing rod attachment leg of a fishing reel to a fishing rod are known. For example, a reel fixing device disclosed in Patent Literature 1 includes a reel seat main body provided with a placing portion on which a fishing rod attachment leg of a fishing reel is placed. A fixed hood for fixing one end of the fishing rod attachment leg is provided at one end of the reel seat main body. At the other end of the reel seat main body, a movable hood is attached movably facing the fixed hood.

The movable hood includes an insertion portion into which the other end of the fishing rod attachment leg is inserted, and an operation knob rotatably attached to the insertion portion. The operation knob includes a tubular base portion screwed to a screw portion provided at the other end of the reel seat main body, and a cover member for decoration attached to an outer peripheral surface of the base portion. The cover member is fixed to the base portion using an adhesive. The adhesive is applied to both the outer peripheral surface of the base portion and an inner peripheral surface of the cover member.

Further, Patent Literature 2 discloses a nut of a fishing rod reel seat, the nut being screwed to a male screw portion of a reel seat main body to move a movable hood, the nut including: an inner cylindrical body having an inner peripheral surface provided with a moving female screw portion screwed to the male screw portion of the reel seat main body; and an outer cylindrical body fixed to an outside of the inner cylindrical body, the outer cylindrical body having an outer peripheral surface serving as at least a part of an outer peripheral surface of the nut, wherein the outer cylindrical body has a through-hole penetrating in an inward and outward direction, and a fixing portion that fixes the outer peripheral surface of the inner cylindrical body and the inner peripheral surface of the outer cylindrical body at a position farther from the movable hood than the through-hole. Patent Literature 2 also describes that the fixing portion preferably has at least one of a bonding portion and a screw portion, and that when the fixing portion has the bonding portion, the outer peripheral surface of the inner cylindrical body and the inner peripheral surface of the outer cylindrical body can be easily fixed by bonding.

CITATION LIST

Patent Literature

Patent Literature 1: JP 2014-161234 A
Patent Literature 2: JP 2020-89310 A

SUMMARY OF INVENTION

Technical Problem

However, in the reel fixing device disclosed in Patent Literature 1, since the adhesive is applied to both the outer peripheral surface of the base portion and the inner peripheral surface of the cover member, there is a possibility that an extra adhesive protrudes from the end of the cover member or the like at the time of assembling and decorativeness is impaired, and there is a problem that when a cover member having a through-hole is used in order to enhance decorativeness of the movable hood, the protruding adhesive easily enters the through-hole. In addition, even if the cover member in which the through-hole is provided is used, there is a problem that a region where the through-hole can be provided is limited in order to bond the inner surface of the cover member to the base portion.

In addition, although the nut for moving the movable hood disclosed in Patent Literature 2 can obtain high decorativeness and smooth rotation, since the fixation is provided by adhesion or a screwing structure between the outer peripheral surface of the inner cylindrical body and the inner peripheral surface of the outer cylindrical body by providing the fixing portion for fixing the outer peripheral surface of the inner cylindrical body and the inner peripheral surface of the outer cylindrical body, a through-hole cannot be provided in a region of the fixing portion and a region where the through-hole can be provided is limited, and thus, there is a problem that there is still a limit to improvement of decorativeness.

The present invention has been made in view of the above circumstances, and an object of the present invention is to provide a nut capable of enabling smooth rotation while reliably fixing an outer tubular portion with an inner tubular portion as well as of improving decorativeness significantly, a fishing rod reel seat having the nut, and a fishing rod having the fishing rod reel seat. Other objects of the present invention will become apparent upon reference to the entirety of the present specification.

Solution to Problem

A nut according to an embodiment of the present invention is a nut for moving a movable hood, the nut being screwed with a male screw portion of a reel seat main body having a reel leg placing portion on which a reel leg is placed, the nut comprising: a nut base portion having a moving female screw portion on an inner peripheral surface and locked to the movable hood at an end, the female screw portion being screwed with the male screw portion of the reel seat main body; an inner tubular portion having a protruding portion or recessed portion, and fixed to an exterior of the nut base portion; and an outer tubular portion having a recessed portion or protruding portion engaged with the protruding portion or recessed portion, and fixed to an exterior of the inner tubular portion by the recessed portion or protruding portion, the outer tubular portion having an outer peripheral surface serving as at least a part of an outer peripheral surface of the nut, wherein the outer tubular portion has a through-hole penetrating in an inward and outward direction, and is provided at a position where at least a part of the through-hole and at least a part of the recessed portion or protruding portion overlap when viewed in an axial direction of the outer tubular portion.

In the nut according to the embodiment of the present invention, two or more protruding portions and two or more recessed portions are provided.

In the nut according to the embodiment of the present invention, the protruding portion is provided for the inner tubular portion, and the recessed portion is provided for the outer tubular portion.

In the nut according to the embodiment of the present invention, the protruding portion and the recessed portion have a rectangular parallelepiped shape. In the nut according to the embodiment of the present invention, the protruding portion has a length in a longitudinal direction in a range of 3 mm to 5 mm, a length in a lateral direction in a range of 0.5 mm to 1.5 mm, and a height in a range of 0.3 mm to 1.0 mm.

In the nut according to the embodiment of the present invention, the recessed portion has a length in a longitudinal direction in a range of 3 mm to 5 mm, a length in a lateral direction in a range of 0.5 mm to 1.5 mm, and a height in a range of 0.3 mm to 1.0 mm.

In the nut according to the embodiment of the present invention, the inner tubular portion comprises a wall portion at one of ends in the axial direction of an outer peripheral surface of the inner tubular portion, and the outer tubular portion is fixed to the inner tubular portion so as to abut on the wall portion.

In the nut according to the embodiment of the present invention, the protruding portion is provided in a range of 5 mm from an end on the movable hood side of one of the inner tubular portion and the outer tubular portion.

In the nut according to the embodiment of the present invention, a region occupied by the through-hole is in a range of 50% to 80% with respect to an entirety of a region of the outer peripheral surface of the outer tubular portion serving as at least the part of the outer peripheral surface of the nut.

In the nut according to the embodiment of the present invention, the outer tubular portion has a radial thickness in a range of 0.3 mm to 1.5 mm.

In the nut according to the embodiment of the present invention, the outer tubular portion has a diameter in a range of 10 mm to 30 mm.

A fishing rod according to the embodiment of the present invention comprises a fishing rod reel seat having the nut according to any of the above described nuts; and a rod body.

A fishing rod reel seat according to the embodiment of the present invention comprises: a reel seat main body having a reel leg placing portion on which a reel leg is placed; a movable hood guided to an outer surface of the reel seat main body, and configured to be movable along an axial direction of the reel seat main body; and a nut provided on the outer surface of the reel seat main body, and configured to move the movable hood along the axial direction, wherein the nut comprises: a nut base portion having a moving female screw portion on an inner peripheral surface and locked to the movable hood at an end, the female screw portion being screwed with the male screw portion of the reel seat main body; an inner tubular portion having a protruding portion or recessed portion, and fixed to an exterior of the nut base portion; and an outer tubular portion having a recessed portion or protruding portion engaged with the protruding portion or recessed portion, and fixed to an exterior of the inner tubular portion by the recessed portion or protruding portion, the outer tubular portion having an outer peripheral surface serving as at least a part of an outer peripheral surface of the nut, and the outer tubular portion has a through-hole penetrating in an inward and outward direction, and is provided at a position where at least a part of the through-hole and at least a part of the recessed portion or protruding portion overlap when viewed in an axial direction of the outer tubular portion.

Advantageous Effects of Invention

According to the above embodiment, it is possible to provide a nut capable of enabling smooth rotation while reliably fixing an outer tubular portion with an inner tubular portion as well as of improving decorativeness significantly, a fishing rod reel seat having the nut, and a fishing rod having the fishing rod reel seat.

DESCRIPTION OF EMBODIMENTS

Hereinafter, an embodiment of a fishing rod according to the present invention will be specifically described with reference to the accompanying drawings. Components common in a plurality of drawings are assigned with the same reference signs throughout the plurality of drawings. It should be noted that each of the drawings is not always illustrated in a precise aspect ratio for the convenience of description.

Figure 1:
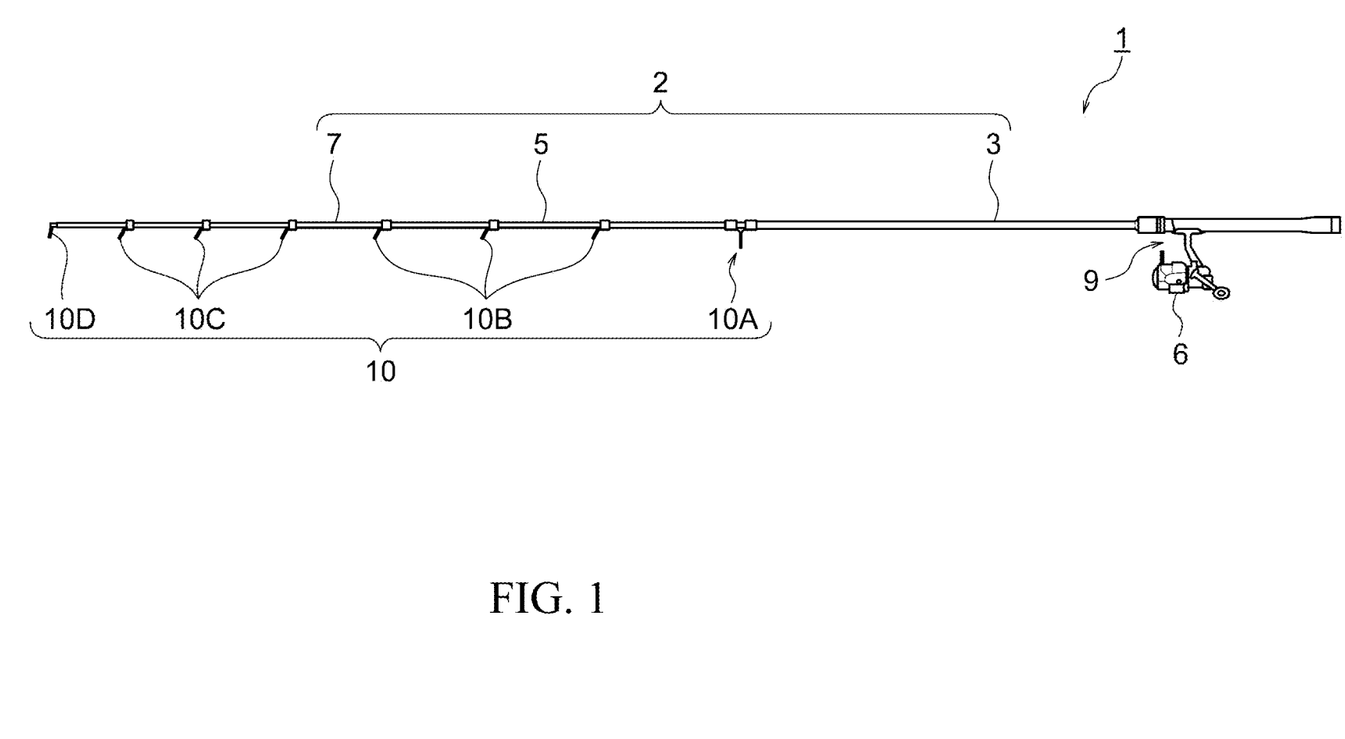
FIG. 1 is a view illustrating a fishing rod according to one embodiment of the present invention.

FIG. 1 is a view showing one embodiment of a fishing rod according to the present invention. As illustrated in the drawing, a fishing rod 1 according to the embodiment of the present invention comprises a rod body 2, a reel 6 attached to the rod body 2 via a reel seat 9, and a fishing line guide 10 attached to the rod body 2. In the illustrated embodiment, each of the reel seat 9 and the fishing line guide 10 corresponds to attachment components attached to an outer peripheral surface of the rod body.

The rod body 2 is constituted by, for example, connecting a base rod 3, a middle rod 5, a tip rod 7, and the like to each other. These rod bodies are jointed to each other, for example, as an ordinarily jointed type. The base rod 3, the middle rod 5, and the tip rod 7 can be joined to each other by a telescopic type, an inversely jointed type, a socket-and-spigot jointed type, or any other known joining method. The rod body 2 may be constituted by a single rod body.

Each of the base rod 3, the middle rod 5, and the tip rod 7 are constituted by, for example, a tubular body made of a fiber-reinforced resin. This tubular body made of a fiber-reinforced resin is produced by winding a fiber-reinforced resin prepreg (prepreg sheet) obtained by impregnating reinforcing fibers with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. An outer surface of the tubular body is appropriately polished. Each of the rod bodies may be provided in a solid state.

In the illustrated embodiment, the base rod 3, the middle rod 5, and the tip rod 7 are provided with a plurality of fishing line guides 10 (fishing line guides 10A to 10D) for guiding a fishing line fed from the reel 6 attached to the reel seat 9. More specifically, the base rod 3 is provided with the fishing line guide 10A, the middle rod 5 is provided with the fishing line guide 10B, and the tip rod 7 is provided with the fishing line guide 10C. The top guide 10D is provided on a distal end of the tip rod 7, but this is not described in detail.

Next, the reel seat 9 comprising a reel seat main body 12 and a nut 8 will be described with reference to FIG. 2. The reel seat 9 comprises the reel seat main body 12 having, along its axial direction, a reel leg placing surface (reel leg placing portion) 12a on which a reel leg 6a of the fishing reel 6 is placed. The reel seat main body 12 is provided in a cylindrical shape as a whole. Further, the reel seat main body 12 is provided by an appropriate material such as a synthetic resin (for example, polyamide synthetic fiber, ABS resin, or the like) or metal (for example, SUS, aluminum, titanium, brass, or the like). The reel seat main body 12 can be configured with, for example, a length of 60 to 160 mm, but is not limited thereto.

In addition, the reel seat main body 12 comprises a grip portion 12b that slightly bulges opposite to the reel leg placing surface 12a, and that has a curved outer surface which is made easy to grip by supporting the thenar or the vicinity thereof when gripped with a gripping hand.

Figure 2:
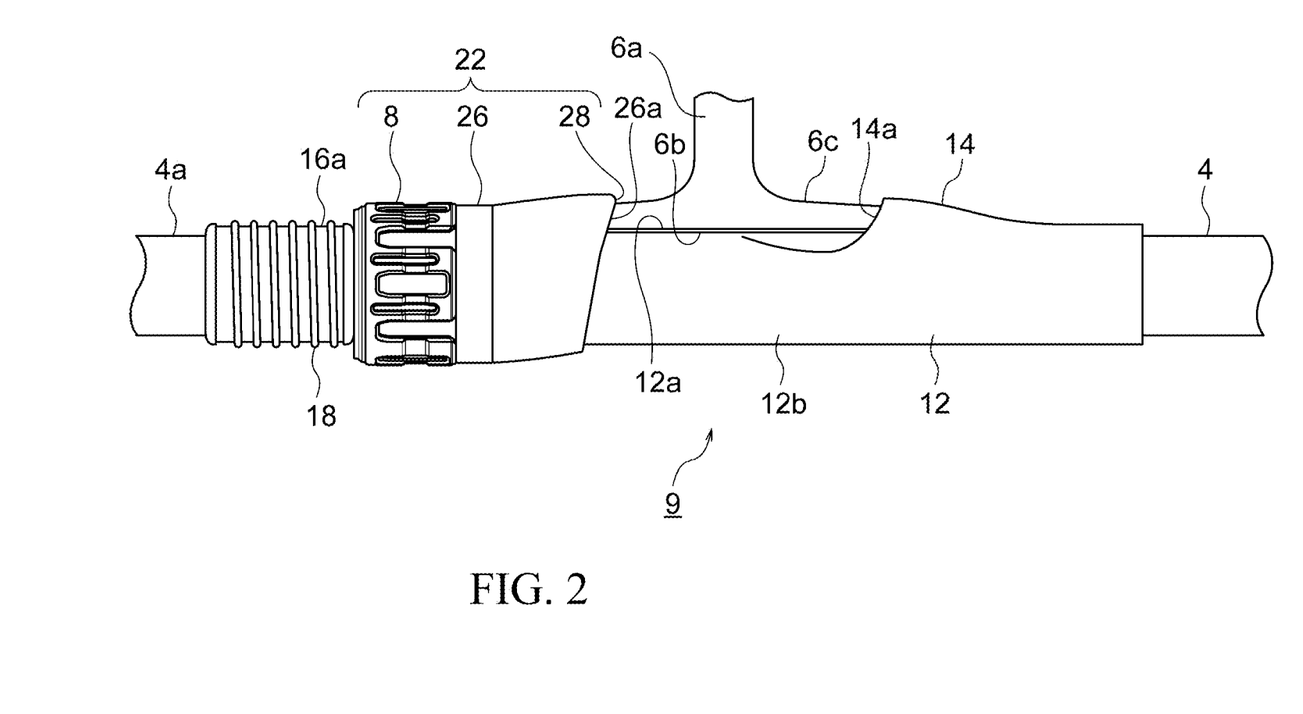
FIG. 2 is a view illustrating a fishing rod reel seat according to the embodiment of the present invention.

The reel leg placing surface 12a of the reel seat main body 12 can be formed flat or substantially flat with a larger curvature than other circumferential portions (for example, the grip portion 12b) adjacent to the reel leg placing surface 12a of the reel seat main body 12, and is formed to extend in the axial direction of the reel seat main body 12 illustrated in FIG. 2. The fixed hood 14 is integrally disposed at one end (rod base side) of the reel seat main body 12. One end of the reel leg placing surface 12a of the reel seat main body 12 is disposed inside the fixed hood 14.

The reel seat main body 12 is integrally provided with a cylindrical body in which a guide groove is formed at the other end (rod bottom side) and a screw portion (male screw portion) 18. In the tubular body, a tubular portion placing surface 16a is formed continuously with the reel leg placing surface 12a of the reel seat main body 12 or with a slight step. In the embodiment of the present invention, a step for disposing the back surface holding portion of the reel leg holding portion 28 is formed between the reel leg placing surface (reel leg placing portion) 12a and the tubular portion placing surface 16a so that a back surface holding portion of the reel leg holding portion 28, which will be described later, on which the back surface (bottom surface) 6b of the reel leg 6a is placed and the reel leg placing surface 12a are as flush as possible. The tubular portion placing surface 16a is also formed continuously with the screw portion (male screw portion) 18. At the other end (rod bottom side), a movable hood 22 is attached to the outside of the cylindrical body and the screw portion 18 so as to be movable in the axial direction. Here, the reel seat 9 may be referred to as comprising the reel seat main body 12 and the movable hood 22, or the reel seat main body 12, the movable hood 22, and the nut 8 that will be described later, but details are omitted.

As illustrated in FIG. 2, in the fixed hood 14 of the reel seat main body 12, an opening 14a that receives one end of the reel leg 6a is opened toward the movable hood 22. The opening 14a of the fixed hood 14 is formed such that the height of an inner surface gradually decreases toward a front of the reel seat main body 12. When one end of the reel leg 6a is received in the opening 14a and the one end of the reel leg 6a is pressed by the opening 14a, the reel leg 6a is biased (pressed) toward the reel leg placing surface 12a disposed in the fixed hood 14.

Note that the fixed hood 14 is not limited to being disposed integrally with the reel seat main body 12, and may be formed in a structure separate from the reel seat main body 12 with a metal or a hard synthetic resin and firmly fixed to the reel seat main body 12. In a case of being formed of metal, it is preferable to dispose a resin member at a portion in contact with the reel leg 6a of the reel 6 to prevent damage to each member due to contact between metals.

The movable hood 22 is formed in a sleeve shape penetrating an axial hole through which the screw portion (male screw portion) 18 of the reel seat main body 12 is inserted, and comprises a hood main body 26, and the reel leg holding portion 28 fixed inside the hood main body 26. The nut 8 according to the embodiment of the present invention is rotatably connected to a rear portion (rod bottom side) of the hood main body 26 of the movable hood 22. The nut 8 is formed of, for example, synthetic resin, metal, polyamide synthetic fiber, ABS resin, aluminum, brass, or the like, the hood main body 26 is formed of, for example, metal (SUS, brass) or the like, and the reel leg holding portion 28 is formed of, for example, polyamide-based synthetic fiber or the like.

A female screw portion 24 to be screwed with the screw portion (male screw portion) 18 is provided on an inner peripheral side of the nut 8, and the outer peripheral side is provided to be less slippery and to be easily rotated. A front end of the nut 8 is connected (locked) to a rear end of the hood main body 26 in a state of being relatively rotatable and prevented from coming off. More specifically, the nut 8 can be configured to comprise a locking portion 25 (see FIG. 3 to be described later) to be locked to a locked portion 23 (see FIG. 3 to be described later) at the rear end of the hood main body 26, and to allow relative rotation freely and prevent from falling off. A connection structure between the nut 8 and the hood main body 26 can be variously considered, and is not limited to a specific aspect.

The nut 8 is screwed with the screw portion (male screw portion) 18 of the reel seat main body 12 and rotatably disposed. As described above, since the hood main body 26 is connected to the nut 8, when the nut 8 is rotated in the positive direction with respect to the screw portion (male screw portion) 18, the hood main body 26 of the movable hood 22 approaches the fixed hood 14 as the nut 8 approaches the fixed hood 14. On the other hand, when the nut 8 is rotated in a direction opposite with respect to the screw portion (male screw portion) 18, the hood main body 26 of the movable hood 22 moves away from the fixed hood 14 as the nut 8 moves away from the fixed hood 14.

The hood main body 26 moved in the axial direction of the reel seat main body 12 by the rotation of the nut 8 has an opening 26a that is opened on the front side and the inner peripheral side and is fixed in a state where the reel leg holding portion 28 for receiving the rear end of the reel leg 6a of the fishing reel 6 is disposed. The opening 26a of the hood main body 26 faces the opening 14a of the fixed hood 14 when the movable hood 22 is attached to the screw portion (male screw portion) 18 of the reel seat main body 12. Contrary to the opening 14a of the fixed hood 14, the opening 26a of the hood main body 26 is provided such that the height of the inner surface gradually decreases toward the rear.

Figure 3:
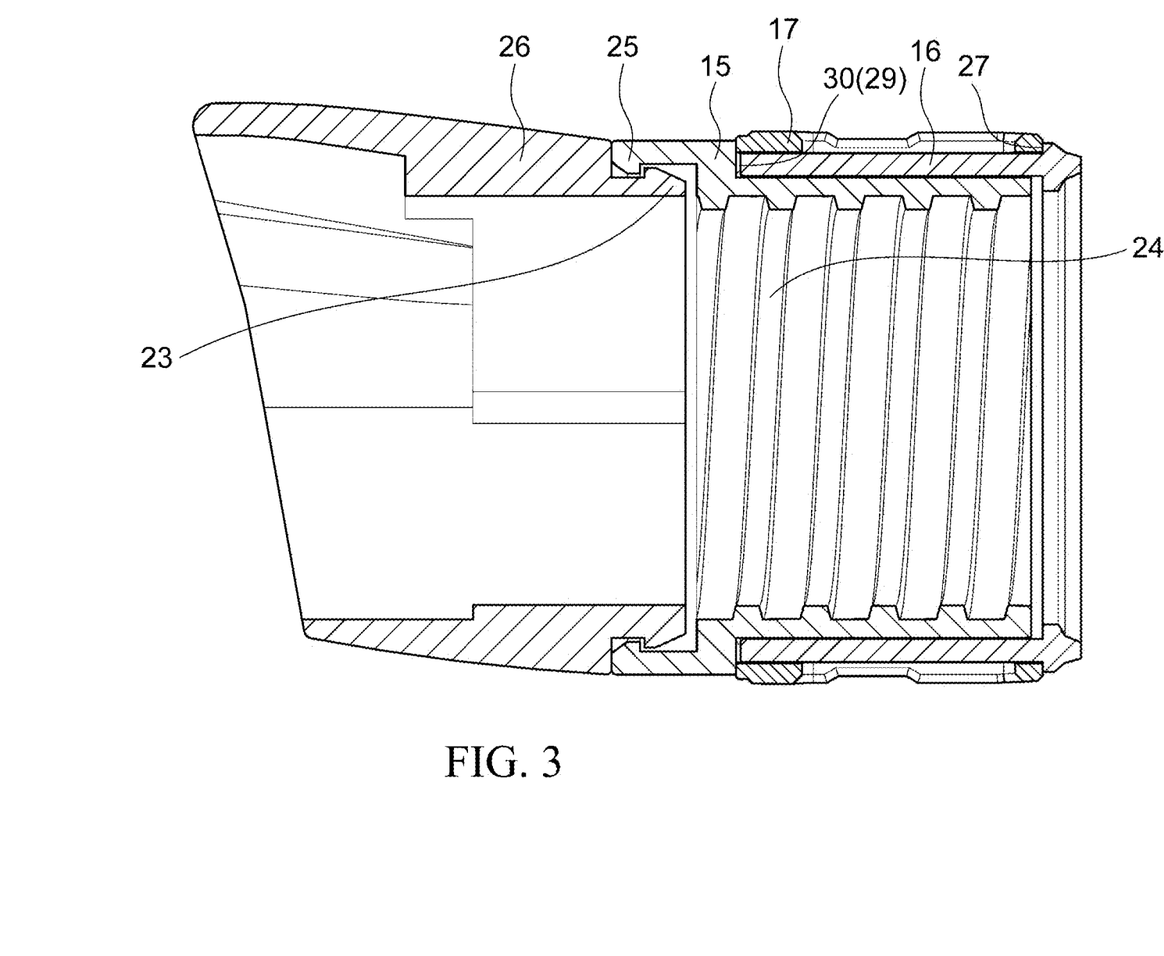
FIG. 3 is a view illustrating a sectional view of a nut according to the embodiment of the present invention.
Figure 4:
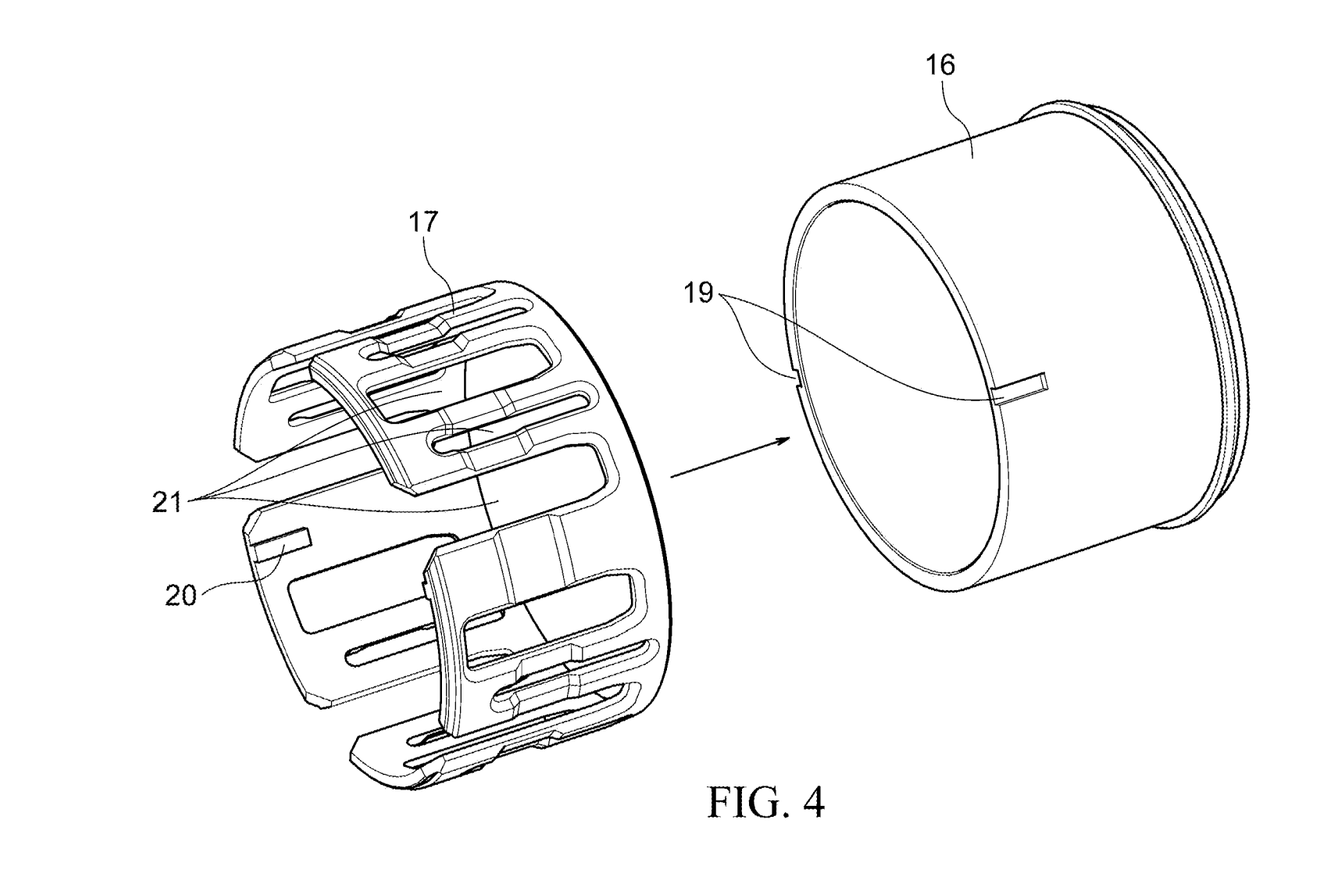
FIG. 4 is a view illustrating an outer tubular portion and an inner tubular portion of the nut according to the embodiment of the present invention.
Figure 5A:
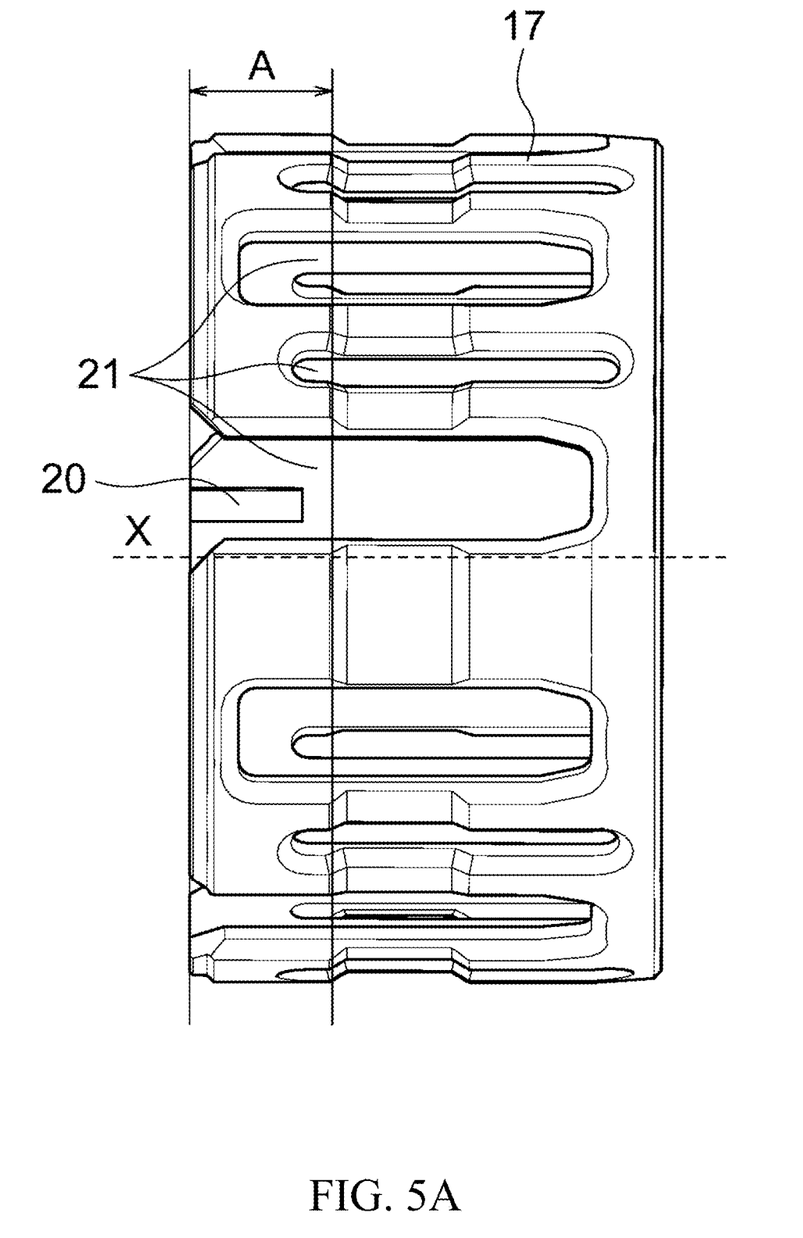
FIG. 5A is a view illustrating the outer tubular portion of the nut according to the embodiment of the present invention.
Figure 5B:
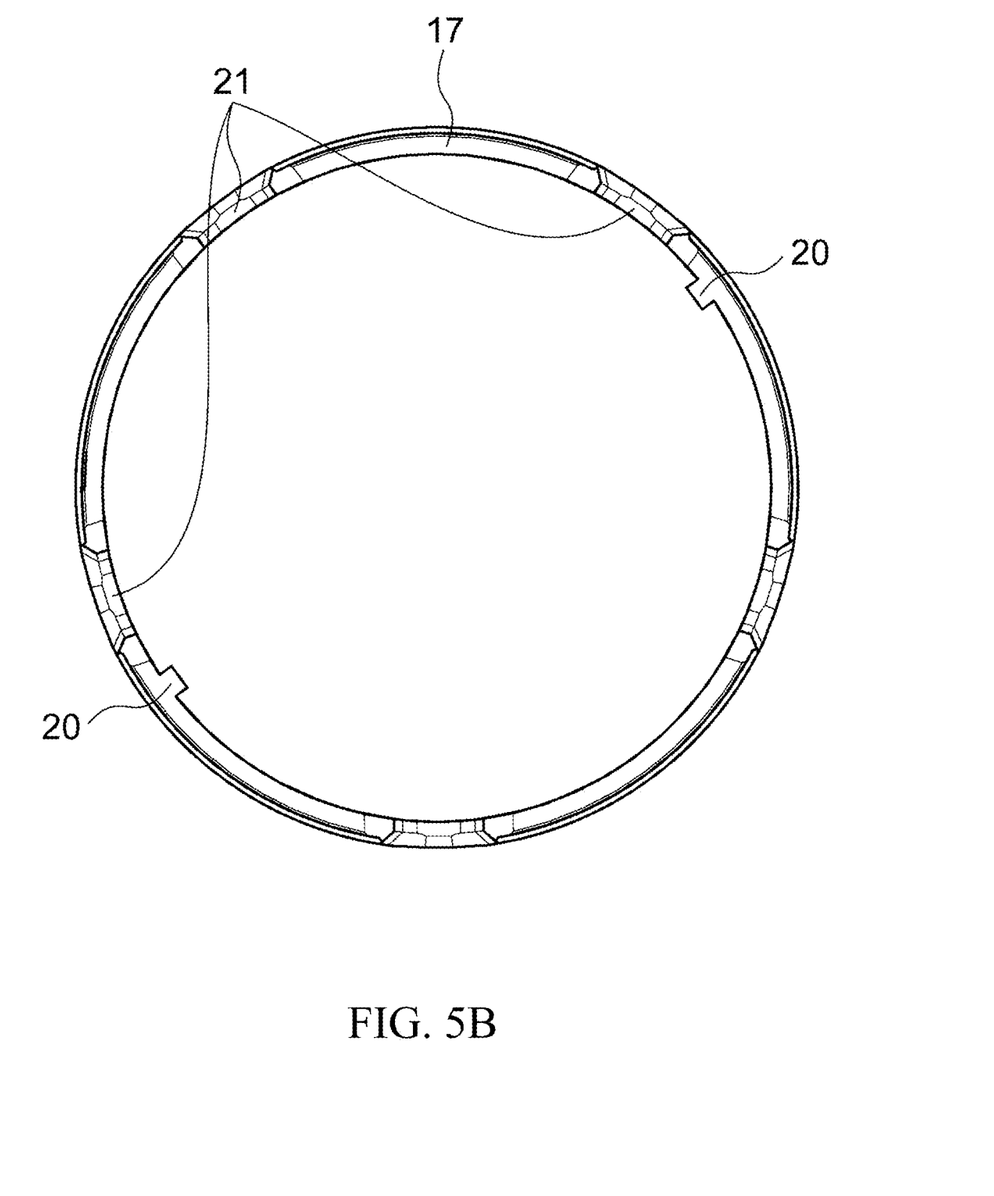
FIG. 5B is a view illustrating the outer tubular portion of the nut according to the embodiment of the present invention.
Figure 6A:
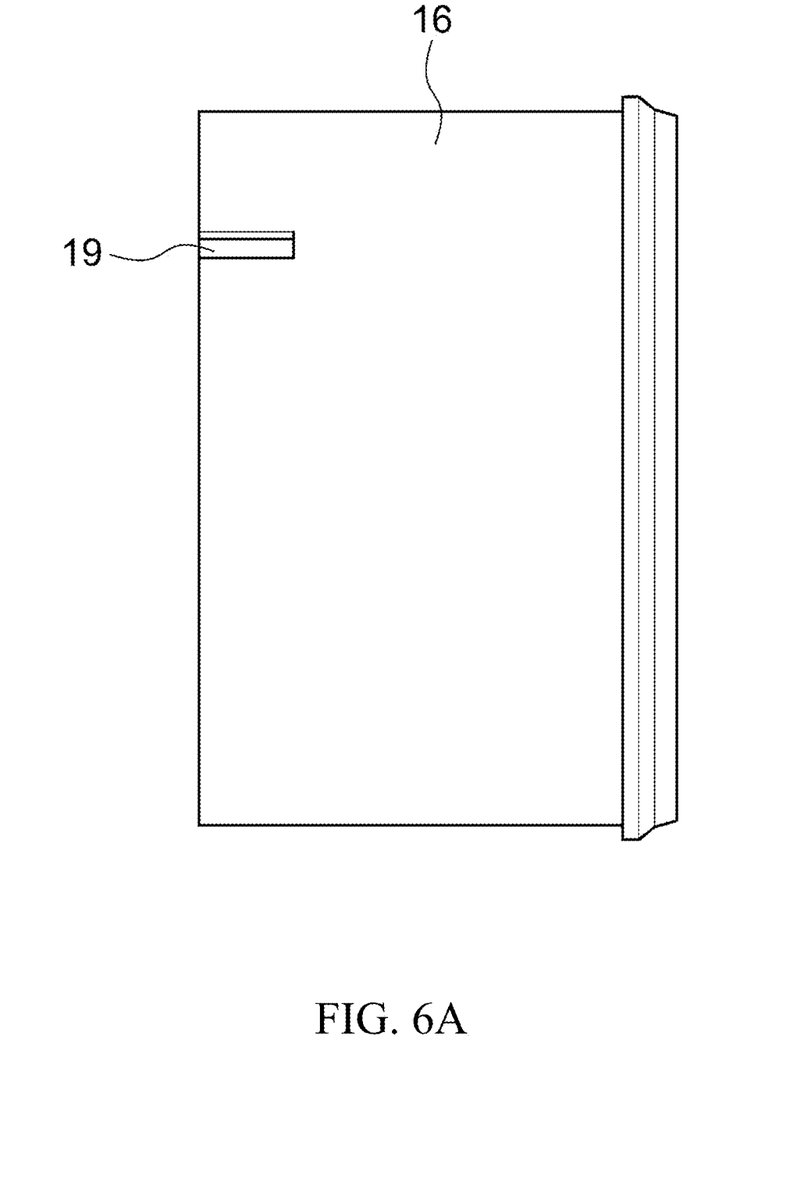
FIG. 6A is a view illustrating the inner tubular portion of the nut according to the embodiment of the present invention.
Figure 6B:
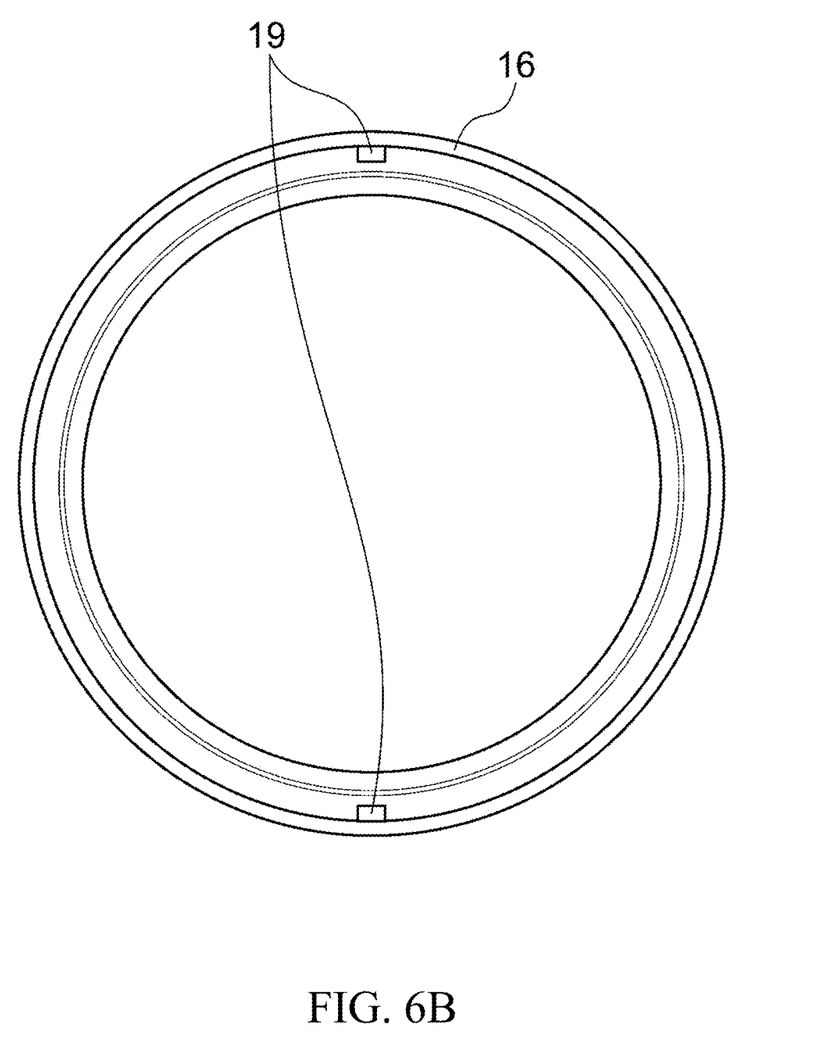
FIG. 6B is a view illustrating the inner tubular portion of the nut according to the embodiment of the present invention.

Next, details of the nut 8 according to the embodiment of the present invention will be further described with reference to FIGS. 2, 3, 4, 5, and 6. FIG. 3 shows a sectional view of the nut 8 and the movable hood 22 according to the embodiment of the present invention taken along a central axis of the nut 8 and the movable hood 22. FIG. 4 shows a part of an exploded view of the nut 8 according to the embodiment of the present invention. FIGS. 5 and 6 show a front view and a top view of the components of the nut 8 according to the embodiment of the present invention.

Figure 7A:
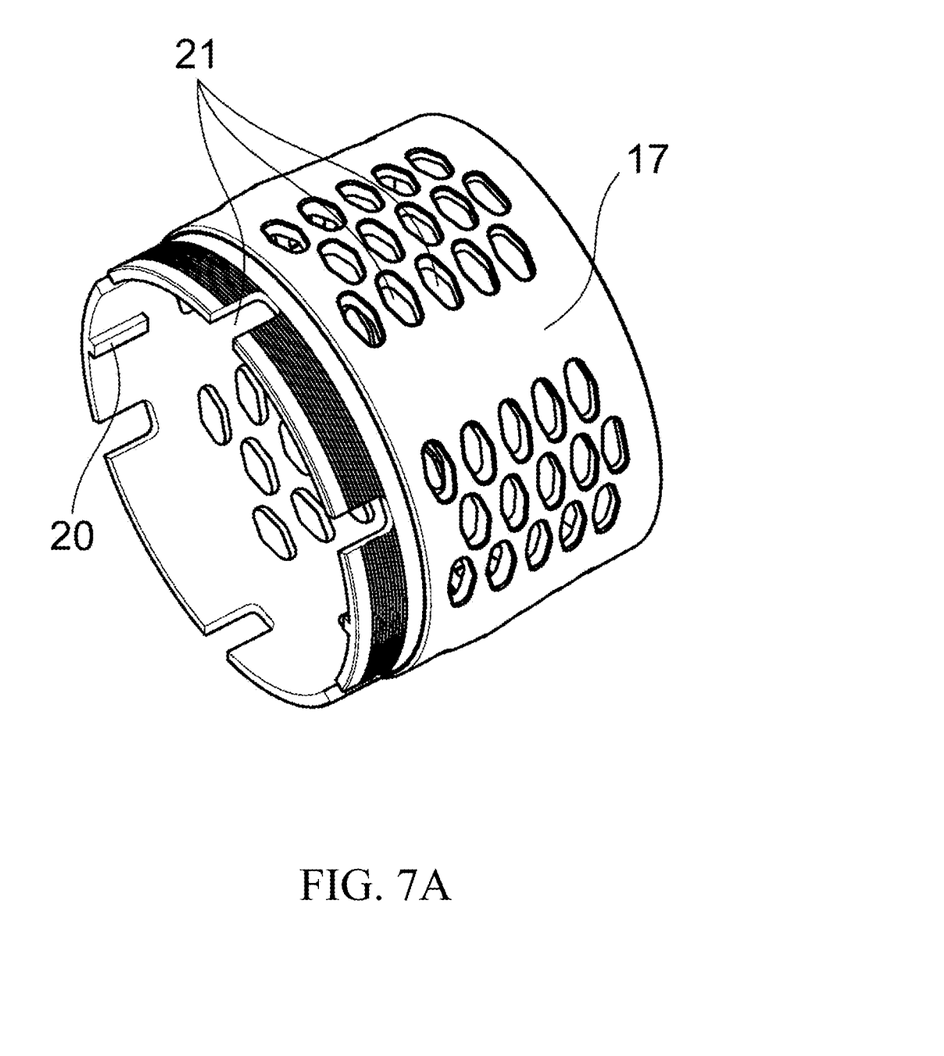
FIG. 7A is a view illustrating the outer tubular portion of the nut according to another embodiment of the present invention.
Figure 7B:
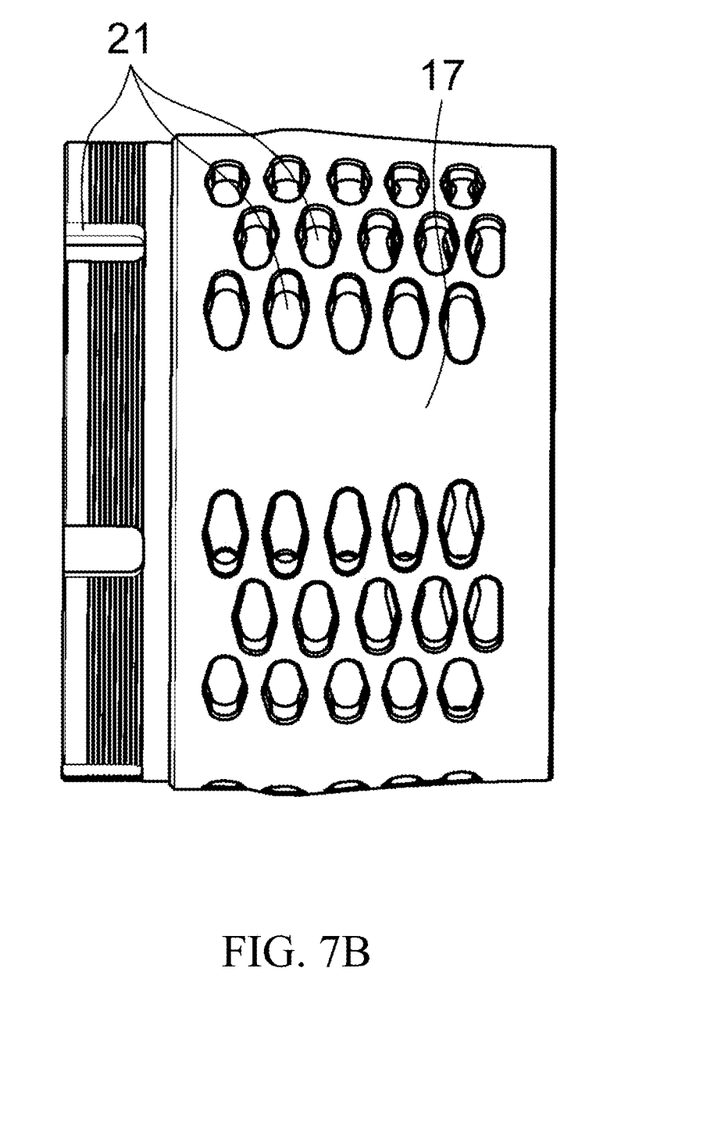
FIG. 7B is a view illustrating the outer tubular portion of the nut according to another embodiment of the present invention.
Figure 7C:
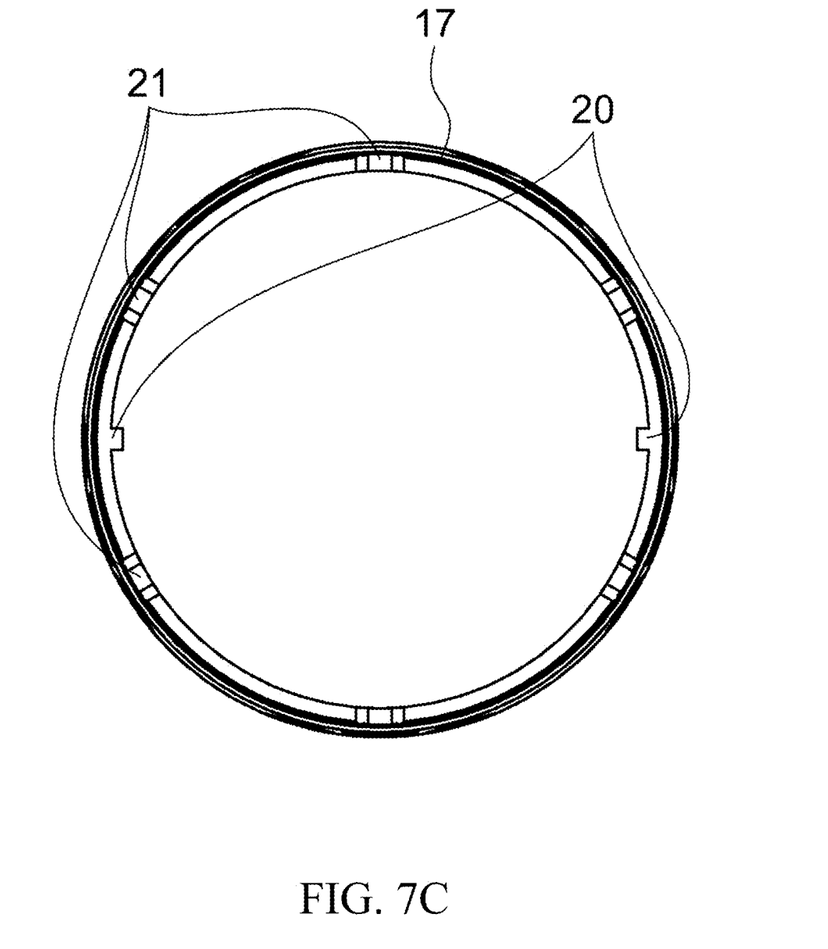
FIG. 7C is a view illustrating the outer tubular portion of the nut according to another embodiment of the present invention.

The nut 8 according to the embodiment of the present invention is the nut 8 for moving the movable hood 22, the nut 8 being screwed with the male screw portion 18 of the reel seat main body 12 having the reel leg placing portion 12a on which the reel leg 6a is placed, the nut 8 comprising: the nut base portion 15 having the moving female screw portion 24 on an inner peripheral surface and locked to the movable hood 22 at an end, the female screw portion 24 being screwed with the male screw portion 18 of the reel seat main body 12; the inner tubular portion 16 having the protruding portion (not shown) or recessed portion 19, and fixed to an exterior of the nut base portion 15; and the outer tubular portion 17 having the recessed portion (not shown) or protruding portion 20 engaged with the protruding portion (not shown) or recessed portion 19, and fixed to an exterior of the inner tubular portion 16 by the recessed portion or protruding portion, the outer tubular portion 17 having an outer peripheral surface serving as at least a part of an outer peripheral surface of the nut, wherein the outer tubular portion has the through-hole 21 penetrating in an inward and outward direction, and is provided at a position where at least a part of the through-hole 21 and at least a part of the recessed portion (not shown) or protruding portion 20 overlap when viewed in the axial direction (X) of the outer tubular portion 17. Note that the inner tubular portion 16 may be provided with one of the protruding portion and the recessed portion, and the outer tubular portion 17 may be provided with, so as to engage with the one of the these, either of the recessed portion and the protruding portion. In addition, the shape, structure, size, and number of the through-holes 21 can be variously considered, and although details are omitted, the outer tubular portion 17 in which the through-hole 21 is provided as illustrated in FIG. 7 can also be used as another aspect. Note that the illustrated example is merely an example, and is not intended to be limited to a specific aspect.

Here, as illustrated in FIG. 5A, when viewed in the axial direction, the through-hole 21 is provided at a position where a region extending in the axial direction and a region where the protruding portion 20 is provided overlap. That is, in the present specification, in a case where the positions in the axial direction are the same, and the protruding portion 20 and the through-hole 21 provided at different circumferential positions when viewed in the circumferential direction of the outer tubular portion 17 are at the same or overlapping positions in the axial direction even if the circumferential positions are different, it is defined as being at the "position overlapping when viewed in the axial direction".

According to the nut of the embodiment of the present invention, it is possible to provide a nut capable of enabling smooth rotation while reliably fixing an outer tubular portion with an inner tubular portion as well as of improving decorativeness significantly. More specifically, in the conventional method, in order to fix the outer tubular portion and the inner tubular portion, it is necessary to provide a region to be fixed over a predetermined axial length for adhesion or screwing, and there has been a problem that a through-hole or the like for decoration cannot be provided substantially over the entire circumferential direction in the region (decorativeness must be sacrificed). On the other hand, according to the nut of the embodiment of the present invention, since the through-hole 21 in the outer tubular portion 17 can be provided at the position where the through-hole overlaps or at least partially overlaps the protruding portion 20, the through-hole 21 for improving the decorativeness can be provided in a wider region than before, and the decorativeness can be greatly enhanced while reliably fixing the outer tubular portion and the inner tubular portion.

In the nut 8 according to the embodiment of the present invention, two or more protruding portions and two or more recessed portions are provided (in the example of FIG. 5, two protruding portions 20 are provided for the outer tubular portion 17, and in the example of FIG. 6, two recessed portions 19 are provided for the inner tubular portion 16). Here, as illustrated in FIG. 5, these two protruding portions 20 are provided so as to be spaced apart by approximately 180 degrees in the circumferential direction, but are not limited to these positions, and may be spaced apart by an angle larger or smaller than this. In addition, in a case where three protruding portions 20 are provided, intervals between the adjacent protruding portions can be set to approximately 120 degrees when viewed in the circumferential direction, but the present invention is not limited thereto. The same can be applied to the recessed portion 19. The number and positions (circumferential position and axial position) at which the protruding portion 20 and the recessed portion 19 are provided are variously considered, and are not intended to be limited to a specific aspect. As a result, the inner and outer tubular portions can be reliably locked.

As described above, the nut 8 according to the embodiment of the present invention may be configured such that the protruding portion is provided for the inner tubular portion 16, and the recessed portion is provided for the outer tubular portion 17.

In the nut 8 according to the embodiment of the present invention, the shape defined by the protruding portion 20 and the recessed portion 20 have a rectangular parallelepiped shape, for example. Note that, in the case of a rectangular parallelepiped shape, an end, an end surface, or a corner portion may be rounded or provided in an R shape due to actual processing constraints (for example, end milling constraints), and it is not necessarily mathematically strict. For example, even if the protruding portion 20 has a rectangular parallelepiped shape, the corner portion of the end surface on the side protruding in the radial direction of the nut 8 may be rounded, or the end on the exterior of the side surface in the radial direction of the nut 8 may be provided in an R shape. The upper surface and the side surface of the rectangular parallelepiped shape may be curved in a protruding shape or a recessed shape. In addition, the protruding portion 20 may not have a rectangular parallelepiped shape, but may have, for example, a trapezoidal shape or an inverted trapezoidal shape when viewed in the radial section of the nut 8, and the corner portion may be appropriately rounded or provided in an R shape. In addition, the shape may be a cube or the like, but various shapes and structures are conceivable, and the illustrated example is merely an example and is not intended to be limited to a specific aspect.

In the nut 8 according to the embodiment of the present invention, when the nut 8 takes a cubic shape (for example, rectangular parallelepiped shape), the protruding portion 20 has a length in a longitudinal direction in a range of 3 mm to 5 mm, a length in a lateral direction in a range of 0.5 mm to 1.5 mm, and a height in a range of 0.3 mm to 1.0 mm. The dimensions of the protruding portion 20 can be variously considered, and the illustrated example is merely an example and is not intended to be limited to a specific aspect. As a result, the inner and outer tubular portions can be reliably locked.

In the nut 8 according to the embodiment of the present invention, when the nut 8 takes a cubic shape (for example, rectangular parallelepiped shape), the recessed portion 19 has a length in a longitudinal direction in a range of 3 mm to 5 mm, a length in a lateral direction in a range of 0.5 mm to 1.5 mm, and a height in a range of 0.3 mm to 1.0 mm. The dimensions of the recessed portion 19 can be variously considered, and the illustrated example is merely an example and is not intended to be limited to a specific aspect. As a result, the inner and outer tubular portions can be reliably locked.

In the nut 8 according to the embodiment of the present invention, the inner tubular portion 16 comprises a wall portion 27 at one of ends in the axial direction of an outer peripheral surface of the inner tubular portion 16 (end on the side opposite to the movable hood 22), and the outer tubular portion 17 is fixed to the inner tubular portion 16 so as to abut on the wall portion 27 (see FIG. 3). In addition, in the nut 8 according to the embodiment of the present invention, the nut base portion 15 comprises a step portion 29, and the inner tubular portion 16 and the outer tubular portion 17 are fixed to the nut base portion 15 so as to abut on a side wall 30 of the step portion 29 (see FIG. 3). In this way, the inner and outer tubular portions can be reliably locked.

As shown in FIG. 5A, in the nut 8 according to the embodiment of the present invention, the protruding portion 20 can be provided in a range of any one of X from the end of the inner tubular portion 16 or the outer tubular portion 17 on the movable hood 22 side (the left side end in the left-right direction of the paper surface of FIG. 5A. The range can be, for example, a region up to 5 mm from the end. More preferably, the range can be a region up to 3 mm from the end. In this way, the inner and outer tubular portions can be reliably locked.

In the nut 8 according to the embodiment of the present invention, a surface area of a region occupied by the through-hole 21 in an entire surface area of the outer peripheral surface of the outer tubular portion 17 (a surface area of the outer peripheral surface when there is no through-hole) is in a range of 50% to 80% with respect to a surface area of an entirety of a region of the outer peripheral surface of the outer tubular portion 17 (the surface area of the outer peripheral surface when there is no through-hole) serving as at least the part of the outer peripheral surface of the nut 8. In this way, the inner and outer tubular portions can be reliably locked.

In the nut 8 according to the embodiment of the present invention, the outer tubular portion 17 has a radial thickness in a range of 0.3 mm to 1.5 mm. In the nut 8 according to the embodiment of the present invention, the outer tubular portion 17 has a diameter in a range of 10 mm to 30 mm.

A fishing rod 1 according to the embodiment of the present invention comprises a fishing rod reel seat 9 having the nut 8 according to any of the above described nuts; and a rod body 2. In this manner, it is possible to provide a fishing rod provided with the fishing rod reel seat having a nut capable of enabling smooth rotation while reliably fixing an outer tubular portion with an inner tubular portion as well as of improving decorativeness significantly.

Further, as illustrated in FIGS. 2, 3, and 4, the fishing rod reel seat 9 according to the embodiment of the present invention is the fishing rod reel seat 9 comprising: the reel seat main body 12 having the reel leg placing portion 12a on which the reel leg 6a is placed; the movable hood 22 guided to the outer surface of the reel seat main body 12 and configured to be movable along the axial direction of the reel seat main body 12; and the nut 8 provided on the outer surface of the reel seat main body 12 and configured to move the movable hood 22 along the axial direction, wherein the nut 8 comprises: the nut base portion 15 having the moving female screw portion 24 on an inner peripheral surface and locked to the movable hood 22 at an end, the female screw portion 24 being screwed with the male screw portion 18 of the reel seat main body 12; the inner tubular portion 16 having the protruding portion (not shown) or recessed portion 19, and fixed to an exterior of the nut base portion 15; and the outer tubular portion 17 having the recessed portion (not shown) or protruding portion 20 engaged with the protruding portion (not shown) or recessed portion 19, and fixed to an exterior of the inner tubular portion 16 by the recessed portion or protruding portion, the outer tubular portion 17 having an outer peripheral surface serving as at least a part of an outer peripheral surface of the nut, wherein the outer tubular portion has the through-hole 21 penetrating in an inward and outward direction, and is provided at a position where at least a part of the through-hole 21 and at least a part of the recessed portion (not shown) and protruding portion 20 overlap when viewed in the axial direction of the outer tubular portion 17.

According to the fishing rod reel seat of the embodiment of the present invention, it is possible to provide a fishing rod reel seat having the nut capable of enabling smooth rotation while reliably fixing an outer tubular portion with an inner tubular portion as well as of improving decorativeness significantly.

Next, results of a test (torque test) for confirming the adhesive strength (fixing strength) between the outer tubular portion and the inner tubular portion when the nut according to the embodiment of the present invention is used will be described. In this test, a torque meter having a rod tube holding portion was used to fix a rod tube to the holding portion, and a torque was measured when a force was applied in a rotating direction to a nut screwed to a reel seat main body of a reel seat attached to the rod tube (using the torque meter), and it was confirmed that there was no problem in adhesive strength (fixing strength) in a wide range from 5 kgf·cm to 100 kgf·cm.

As a result, it was found that the outer tubular portion and the inner tubular portion are not separated from each other and good adhesive strength (fixing strength) was maintained even when the nut comprising any of the outer tubular portions in FIGS. 4 and 7 was used. As described above, it has been found that the nut according to the embodiment of the present invention can reliably fix the outer tubular portion and the inner tubular portion. As a result, according to the nut of the embodiment of the present invention, it is possible to enable smooth rotation while reliably fixing an outer tubular portion with an inner tubular portion as well as to improve decorativeness significantly.

The dimensions, materials, and arrangements of the components described herein are not limited to those explicitly described in the embodiment, and the components can be modified so as to have any dimensions, materials, and arrangements that can fall within the scope of the present invention. Components not explicitly described in the present specification can also be added to the described embodiment, or some of the components described in the embodiment can be omitted.

REFERENCE SIGNS LIST

1 Fishing rod
2 Rod body
3 Base rod
5 Middle rod
6 Reel
6a Reel leg
7 Tip rod
8 Nut
9 Reel seat
10 Fishing line guide
12 Reel seat main body
12a Reel leg placing surface
14 Fixed hood
15 Nut base portion
16 Inner tubular portion
17 Outer tubular portion
18 Screw portion (male screw portion)
19 Recessed portion
20 Protruding portion
21 Through-hole
22 movable hood
23 Locked portion
24 Female screw portion
25 Locking portion
26 Hood main body
27 Wall portion
28 Reel leg holding portion
29 Step portion
30 Side wall

The invention claimed is:

1. A nut for moving a movable hood, the nut being screwed with a male screw portion of a reel seat main body having a reel leg placing portion on which a reel leg is placed, the nut comprising:
a nut base portion having a moving female screw portion on an inner peripheral surface and locked to the movable hood at an end, the female screw portion being screwed with the male screw portion of the reel seat main body;
an inner tubular portion having a protruding portion or recessed portion, and fixed to an exterior of the nut base portion; and
an outer tubular portion having a recessed portion or protruding portion engaged with the protruding portion or recessed portion, and fixed to an exterior of the inner tubular portion by the recessed portion or protruding portion, the outer tubular portion having an outer peripheral surface serving as at least a part of an outer peripheral surface of the nut, wherein
the outer tubular portion has a through-hole penetrating in an inward and outward direction, and is provided at a position where at least a part of the through-hole and at least a part of the recessed portion or protruding portion overlap when viewed in an axial direction of the outer tubular portion.

2. The nut according to claim 1, wherein
two or more protruding portions and two or more recessed portions are provided.

3. The nut according to claim 1, wherein
the protruding portion is provided for the inner tubular portion, and the recessed portion is provided for the outer tubular portion.

4. The nut according to claim 1, wherein
the protruding portion and the recessed portion have a rectangular parallelepiped shape.

5. The nut according to claim 4, wherein
the protruding portion has a length in a longitudinal direction in a range of 3 mm to 5 mm, a length in a lateral direction in a range of 0.5 mm to 1.5 mm, and a height in a range of 0.3 mm to 1.0 mm.

6. The nut according to claim 4, wherein
the recessed portion has a length in a longitudinal direction in a range of 3 mm to 5 mm, a length in a lateral direction in a range of 0.5 mm to 1.5 mm, and a height in a range of 0.3 mm to 1.0 mm.

7. The nut according to claim 1, wherein
the inner tubular portion comprises a wall portion at one of ends in the axial direction of an outer peripheral surface of the inner tubular portion, and the outer tubular portion is fixed to the inner tubular portion so as to abut on the wall portion.

8. The nut according to claim 1, wherein
the protruding portion is provided in a range of 5 mm from an end on the movable hood side of one of the inner tubular portion and the outer tubular portion.

9. The nut according to claim 1, wherein
a region occupied by the through-hole is in a range of 50% to 80% with respect to an entirety of a region of the outer peripheral surface of the outer tubular portion serving as at least the part of the outer peripheral surface of the nut.

10. The nut according to claim 1, wherein
the outer tubular portion has a radial thickness in a range of 0.3 mm to 1.5 mm.

11. The nut according to claim 1, wherein
the outer tubular portion has a diameter in a range of 10 mm to 30 mm.

12. A fishing rod comprising:
a fishing rod reel seat comprising the nut according to claim 1; and
a rod body.

13. A fishing rod reel seat, comprising:
a reel seat main body having a reel leg placing portion on which a reel leg is placed;

a movable hood guided to an outer surface of the reel seat main body, and configured to be movable along an axial direction of the reel seat main body; and a nut provided on the outer surface of the reel seat main body, and configured to move the movable hood along the axial direction, wherein the nut comprises:

a nut base portion having a moving female screw portion on an inner peripheral surface and locked to the movable hood at an end, the female screw portion being screwed with a male screw portion of the reel seat main body;

an inner tubular portion having a protruding portion or recessed portion, and fixed to an exterior of the nut base portion; and an outer tubular portion having a recessed portion or protruding portion engaged with the protruding portion or recessed portion, and fixed to an exterior of the inner tubular portion by the recessed portion or protruding portion, the outer tubular portion having an outer peripheral surface serving as at least a part of an outer peripheral surface of the nut, and the outer tubular portion has a through-hole penetrating in an inward and outward direction, and is provided at a position where at least a part of the through-hole and at least a part of the recessed portion or protruding portion overlap when viewed in an axial direction of the outer tubular portion.

* * * * *